Sept. 17, 1968   R. E. ECKELS   3,401,576
COLLAPSIBLE STEERING COLUMN
Filed May 23, 1966
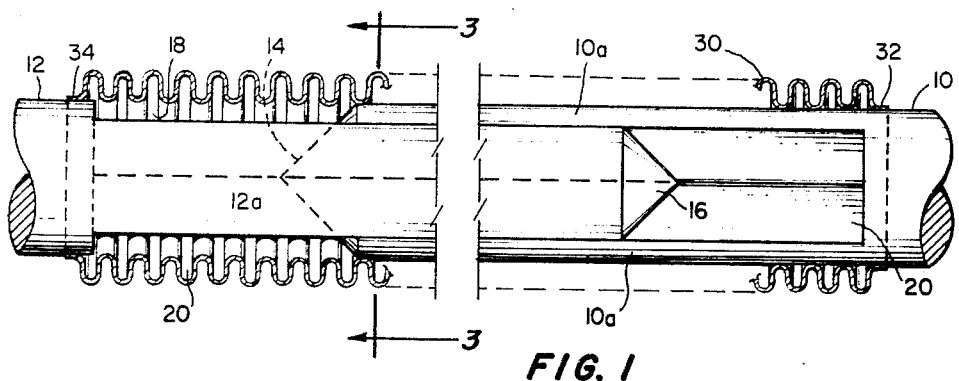
FIG. 1
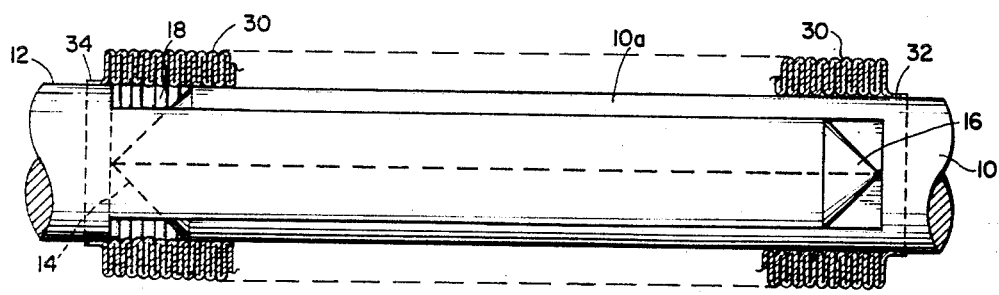
FIG. 2
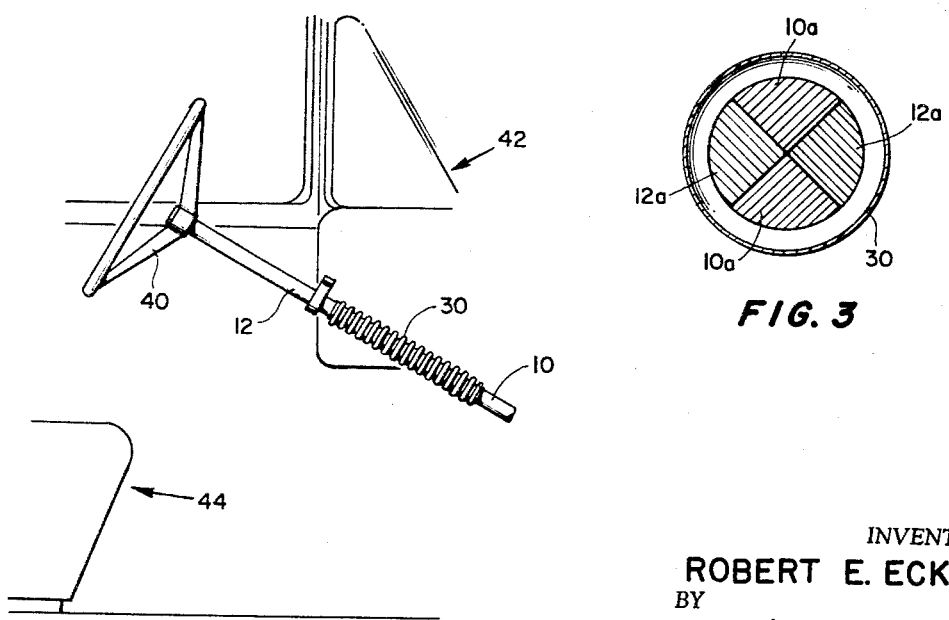
FIG. 3
FIG. 4
INVENTOR.
ROBERT E. ECKELS
BY
Richard D. Low
ATTORNEY

United States Patent Office 3,401,576
Patented Sept. 17, 1968

3,401,576
COLLAPSIBLE STEERING COLUMN
Robert E. Eckels, 2101 Youngfield,
Golden, Colo. 80401
Filed May 23, 1966, Ser. No. 553,004
5 Claims. (Cl. 74—493)

ABSTRACT OF THE DISCLOSURE

An impact absorbing, collapsible steering column uses two rod portions connected for conjoint rotation and slidable on each other for shortening while retaining the rotatable connection. An energy absorbing collapsible bellows is attached to the two rod portions covering the connection and arranged to absorb impact energy applied to either end of the column on collapsing the undulations of the bellows.

---

This invention relates to safety devices for vehicles, and more particularly to collapsible steering columns for motor vehicles and the like, absorbing some of the impact energy of a driver's body against the steering wheel.

Economical and effective safety features in motor vehicles, particularly passenger vehicles, have been sadly neglected by the major manufacturers of the world. The rising death toll on the Nation's and on the world's highways has brought into focus the lack of simple safety features which conceivably could save thousands of lives, and which, in reality, increase very little the total cost of the vehicle to the consumer. Many accidents are single vehicle accidents, that is, where only a single vehicle is involved in an accident, and many such accidents are sole occupant accidents, that is, only a driver is in the vehicle. In practically all vehicle accidents which involve a head-on or partial head-on collision, the momentum of the driver of the vehicle tends to catapult his body forward toward the steering wheel and column. The force at which the body is propelled toward the steering wheel and column is unbelievable, and in many accidents the steering wheel is broken off and the body of the driver is impaled on the steering column. Since a driver is always involved in an accident, the injuries and fatalities resulting from the body of the driver striking the steering wheel or steering post far exceed other injuries to passengers in vehicles.

According to the present invention I have provided a collapsible steering column which absorbs a great amount of the energy expended against it by the body of the person of the driver, slowing the body down and preventing many of the serious injuries which would otherwise occur as by the steering wheel breaking and the person being impaled upon the steering column. The arrangement of the collapsing of the steering wheel is such that there is still vehicular control after the column has collapsed so that the vehicle may be moved and the front wheels turned at least to some extent for steering purposes. Further, the steering wheel, after collapsing the column, is out of the way in the driver's compartment.

Included among the objects and advantages of the present invention is a collapsible steering column which absorbs a substantial amount of the energy of a body propelled against the steering wheel and steering column of a vehicle, and also slows down the velocity of such a body.

Another object and advantage of the invention is to provide a steering wheel column which collapses and still provides at least partial steering after collapsing.

These and other objects and advantages of the invention may be readily ascertained by referring to the following illustrations and appended specification. In the drawings:

FIG. 1 is a side elevation, partially schematic and partially cut away, of a collapsible steering column according to the invention;

FIG. 2 is a side elevation, partially schematic and partially cut away, of the steering column of FIG. 1 in collapsed condition;

FIG. 3 is a cross-sectional view of the steering column of FIG. 1 taken on section lines 3—3; and FIG. 4 is a partially schematic view of a steering wheel assembly, with a steering column, in a vehicle according to the invention.

In the device illustrated, the main rotation portion of a steering column 10 is split into two parts 10 and 12. The ends of each of the parts are bifurcated with a wedge-shaped cutout portion of approximately 90° opposite each other. As shown in section of FIG. 3, the column portion 12 has a 90° cutout portion in the vertical position to correspond with that portion of the column 10. Thus, the two ends of the column 10 and 12 overlap each other with the bifurcated ends 10a and 12a overlapping and providing means for rotating the lower part of the column by the upper column which is turned by a steering wheel, as set out below. The end of each bifurcated section 10a is pointed at 14, and each end 12a is pointed at 16. The column is arranged with only the ends of the bifurcated portions overlapping, leaving a space from the end of the other bifurcated portion to the solid part of the column. Thus, a space 18 on the upper side and a space 20 on the lower side is provided on the column portion 12, between the solid portion and the end 14 of the column portion 12. In a similar manner, a space 22 is provided for the column portion 10 with a space opposite (not shown). The bifurcated ends of each column part are arranged to slide in the space.

The two column portions are maintained apart by means of a convoluted or helical tube 30 which is welded at one end 32 to the column portion 10 and at its opposite end 34 to the column portion 12, holding the two members apart in fixed relation with the bifurcated ends partially overlapping. By welding the convolute or helical tube to the two steering column parts the steering column is in effect a one-piece member where the turning of a steering wheel will rotate column for turning the front wheels in conventional manner. As shown in FIG. 4 the steering column portion 12 is maintained in connection with steering part 10 by means of a convolute tube 30. A steering wheel 40 is mounted on the upper end of the steering column portion 12 and it acts in a conventional manner in a vehicle which includes a side, shown in general by 42, including windows, etc., and a seat, shown in general by 44.

The convolute or helical tube should have sufficient thickness that it has a failure or collapsing pressure high enough to prevent accidental compressing of the helical portions, but has a sufficiently low failure pressure as to give under the initial pressure of a body propelled against the steering wheel as the result of a sudden stop, such as occurs in a head-on collision. On failure, the convoluted tube will compress the open convolutes or helices. As shown in FIG. 2, on an accident where a body is propelled against the wheel with sufficient pressure to cause a failure of the tube on the outside of the steering column, the helices or convolutes of the tube are compressed or mashed together with the bifurcated ends of the two parts of steering column telescoping on each other. Initially, the impact of the body against the steering wheel will start the collapsing of the steering column and as the distance between the undulations of the tube decreases, the movement of the metal during the pushing of the undulations together absorbs the energy of the body pressing against it. After the column has been completely collapsed there is still directional control since the steering column is still intact between the steering wheel and worm gear box of steering mechanism, although the column is shortened. The failure pressure of the collapsible tube should be less than the failure pressure on the steering wheel, thus maintaining the steering wheel intact and providing means for turning the front wheels after a collision. On collapse of the tube, the steering wheel is moved forward and out of the way in the driver's compartment, facilitating rescue of the driver and, also, preventing more serious damage to the driver since the energy of the body being propelled forward is absorbed by the collapsing helical or convolute tube.

Various convolute or helical tubes may be used, as well as various types of metal. The criterion is essentially the pressure necessary to collapse the open undulation for shortening the column. Repair of the collapsed column is simple; by merely replacing the collapsed tube it is reverted to its original length and function. Also, to facilitate repair a threaded sleeve may be used to hold the tube in position on the column parts.

While the invention has been illustrated by reference to a particular illustration, there is no intent to limit the spirit or scope of the invention to precise details so set forth except as defined in the following claims.

I claim:

1. A safety, collapsible steering column for absorbing impact energy comprising a steering rod having an upper and lower part, said upper part being arranged for connection to a steering wheel and said lower part being arranged for connection to a wheel turn mechanism; said upper and lower parts having a sliding connection therebetween whereby one part rotates the other and the combined length thereof may be changed from a long to a short length while permitting one part to turn the other; a normally rigid bellows-shaped tube having open undulations telescoped over and covering the connection between the two rod parts, said bellows-shaped tube being collapsible under high impact energy; one end of said tube being secured to one rod part and the opposite end of said tube being secured to the other rod part; said tube being arranged to collapse on itself under high impact energy, absorbing a substantial portion of said energy during the collapsing and to permit the shortening of the combined length of said rod while retaining rotative connection between said two rod parts.

2. A collapsible steering column according to claim 1 wherein said bellows-shaped tube is a corrugated tube having helical corrugation with a space between each helix to permit collapsing.

3. A collapsible steering column according to claim 1 wherein said bellows-shaped tube is a corrugated tube having an open convolute arranged to collapse on each other for shortening said rod.

4. A collapsible steering column according to claim 1 wherein both said rods include a bifurcated end each mating with the other and slidable together.

5. A collapsible steering column according to claim 2 wherein said tube covers both said bifurcated ends, and one end of said tube is welded to one said rod and the other tube is welded to the other said rod.

References Cited

UNITED STATES PATENTS

| | | | |
|---|---|---|---|
| 1,523,951 | 1/1925 | Fulton | 138—121 |
| 1,688,649 | 10/1928 | O'Connor | 74—493 |
| 2,876,654 | 3/1959 | Sweitzer | 74—492 |
| 3,167,974 | 2/1965 | Wilfert | 74—492 |

FOREIGN PATENTS

| | | |
|---|---|---|
| 845,149 | 5/1939 | France. |
| 1,099,372 | 2/1960 | Germany. |

OTHER REFERENCES

"Collapsible Column," Product Engineering, p. 62, Mar. 14, 1966, vol. 37 No. 3.

FRED C. MATTERN, JR., *Primary Examiner.*

C. F. GREEN, *Assistant Examiner.*